United States Patent
Wang (10) Patent No.: US 11,423,941 B2
(45) Date of Patent: Aug. 23, 2022

(54) WRITE-A-MOVIE: UNIFYING WRITING AND SHOOTING

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 82 days.

(21) Appl. No.: 17/035,443

(22) Filed: Sep. 28, 2020

(65) Prior Publication Data

US 2022/0101880 A1 Mar. 31, 2022

(51) Int. Cl.
*G11B 27/031* (2006.01)
*G06F 40/289* (2020.01)
(Continued)

(52) U.S. Cl.
CPC ........ *G11B 27/031* (2013.01); *G06F 3/04842* (2013.01); *G06F 40/166* (2020.01);
(Continued)

(58) Field of Classification Search
CPC ..... G11B 27/031; G11B 27/034; G11B 27/34; G11B 2220/90; G11B 2220/20;
(Continued)

(56) References Cited

U.S. PATENT DOCUMENTS

| 2008/0007567 A1* | 1/2008 | Clatworthy | ............. G06T 15/00 345/619 |
| 2010/0122193 A1* | 5/2010 | Lange | ..................... G06T 13/00 345/473 |

(Continued)

FOREIGN PATENT DOCUMENTS

WO WO-2010045733 A1 * 4/2010 ............. G06T 13/40

OTHER PUBLICATIONS

Scott Meslow, "How Hollywood Chooses Scripts: The Insider List That Led to Abduction," The Atlantic, Sep. 23, 2011, https://www.theatlantic.com/entertainment/archive/2011/09/how-hollywood-chooses-scripts-the-insider-list-that-led-to-abduction/245541/.
(Continued)

*Primary Examiner* — Thai Q Tran
*Assistant Examiner* — Nienru Yang
(74) *Attorney, Agent, or Firm* — Anova Law Group PLLC (57) ABSTRACT

A method and device for implementing Write-A-Movie technology. The method includes: obtaining a screenplay of a movie; generating, according to the screenplay, an action list by performing natural language processing (NLP) on the screenplay, the action list comprising a plurality of actions with attributes, the attributes of each action including a subject, a predicate, and a location of the action; rendering, according to the action list, three-dimensional (3D) data in 3D scenes of the movie, the 3D data reflecting, for each action, the subject performing the action at the location in a corresponding 3D scene; determining camera sequence of cameras for shooting two-dimensional (2D) frames in the 3D scenes by performing an auto-cinematography optimization process; and generating a 2D video of the movie by combining the 2D frames shot by the cameras based on the determined camera sequence.

20 Claims, 7 Drawing Sheets

(51) Int. Cl.
*G06F 3/04842* (2022.01)
*G06T 15/00* (2011.01)
*G06T 13/40* (2011.01)
*G06F 40/166* (2020.01)

(52) U.S. Cl.
CPC ............ *G06F 40/289* (2020.01); *G06T 13/40* (2013.01); *G06T 15/00* (2013.01); *G06T 2200/24* (2013.01)

(58) Field of Classification Search
CPC ... G11B 27/024; G06F 40/166; G06F 40/289; G06F 3/04842; G06T 13/40; G06T 15/00; G06T 2200/24
USPC .......................................................... 386/281
See application file for complete search history.

(56) References Cited

U.S. PATENT DOCUMENTS

| | | | | |
|---|---|---|---|---|
| 2013/0124984 | A1* | 5/2013 | Kuspa | H04N 21/4394 715/255 |
| 2019/0107927 | A1* | 4/2019 | Schriber | G06F 3/0482 |

OTHER PUBLICATIONS

Ashley S. Meyers, "How Much Should a Writer Get Paid for Their Screenplay," Sep. 17, 2020, http://www.sellingyourscreenplay.com/screenwriting-faq/how-much-should-a-writer-get-paid-for-their-screenplay/.

Luisa Verdoliva, "Media Forensics and Deepfakes: an overview," arXiv preprint arXiv:2001.06564, Jan. 18, 2020.

"The Shining starring Jim Carrey : Episode 3—Here's Jimmy! [DeepFake]," Jul. 12, 2019, https://www.youtube.com/watch?v=Dx59bskG8dc.

H. Jiang et al., "Example-driven Virtual Cinematography by Learning Camera Behaviors," ACM Trans. Graph., vol. 39, No. 4, Article 1. Publication date: Jul. 2020.

B. Merabti et al., "A Virtual Director Using Hidden Markov Models", Computer Graphics Forum, Wiley, 2015.

Q. Galvane, "Automatic Cinematography and Editing in Virtual Environments," Graphics, Grenoble 1 UJF—Universite Joseph Fourier, 2015.

A. Truong et al, "QuickCut: An Interactive Tool for Editing Narrated Video", UIST 2016.

M. Wang et al, "Write-A-Video: Computational Video Montage from Themed Text", ACM Trans. Graphics, vol. 38, No. 6, Nov. 2019.

"Interactive Film," Wikipedia, Sep. 17, 2020, https://en.wikipedia.org/wiki/Interactive_film.

"List of Interactive Movies/Series on Netflix," What's on Netflix, Sep. 17, 2020, https://www.whats-on-netflix.com/library/interactive-titles-on-netflix/.

A Hitchens, "Netflix's Carla Engelbrecht Chooses her Own Adventures," Culture, Aug. 19, 2019, https://www.wired.com/story/culture-fan-tastic-planet-netflix-carla-engelbrecht/.

A. Louarn et al., "Automated Staging for Virtual Cinematography", in 11th annual Conference on Motion, Interaction and Games, Nov. 2018, Limassol, Cyprus, pp. 1-10.

* cited by examiner

Fade In

INT AUNT MARY'S HOUSE - DAY

The film opens by panning over a grand house. Rapunzel steps out the front door, carrying a large suitcase. Behind her is ELLA (8/F). Rapunzel turns and lowers her head to speak with the young girl. ELLA is sitting on her bedroom floor reading a book. Her room is messy, and she is surrounded by stacks of storybooks. Her pet bird, CARL, sits in his cage. ELLA restlessly squirms around on the floor holding her book, moving to different positions.

Rapunzel (Excited)

I'll only be gone for two days. Ella, promise me that you'll be good while I'm away. No messes, no staying up past 8, and no reading any books that you aren't supposed to. Do you understand?

Carl

Squawk!

Rapunzel

402 until soldiers from a nearby kingdom find the flower and use it to heal their ailing and pregnant queen. Shortly afterward, the Queen gives birth to a shockingly blonde Princess Rapunzel. While attempting to recover the flower, Gothel discovers that Rapunzel's golden hair contains the flower's healing properties.

Screenplay Editor

| + Fade In | + Header | + Description |
| --- | --- | --- |
| +Character & Dialogue | | + Fade Out |

4022

Fade In

| INT | AUNT MARY | DAY |

The film opens by panning over a grand house. Rapunzel steps out the front door, carrying a large suitcase. Behind her is ELLA (8/F). Rapunzel turns and lowers her head to speak with the young girl. ELLA is sitting on her bedroom floor reading a book. Her room is messy, and she is surrounded by stacks of storybooks. Her pet bird, CARL, sits in his cage. ELLA restlessly squirms around on the floor 4024 holding her book, moving to different positions.

| Rapunzel | Excited |

I'll only be gone for two days. Ella, promise me that you'll be good while I'm away. No messes, no staying up past 8, and no reading any

WRITE-A-MOVIE: UNIFYING WRITING AND SHOOTING

FIELD OF THE DISCLOSURE

The present disclosure relates to the field of computer graphics technologies and, more particularly, relates to a method and device for movie generation, and a write-a-movie technology that unifies writing and shooting.

BACKGROUND

In traditional movie industry, screenplay writing and filmmaking are completely separate processes. As emphasized in "Directing Film Techniques and Aesthetics" by Rabiger et al., "the writer is the writer, not the director." In other words, it says "a screenwriter handing a script to a director, must leave room for the other creative talents on the crew (director, actors, cinematographers, production designers, editors, etc.) to do their jobs." The separation of writing and filmmaking processes in movie industry are due to historical and technical reasons, and have many differences.

For these two separated components, i.e., writing and filmmaking, it is quite feasible a normal educated human being to write a story or screenplay (if following a certain format), compared to the almost impossible mission of filmmaking. With the latest development of Artificial Intelligence (AI) technology, some works in the filmmaking process can be achieved by computer. However, there are rare attempts to combine the writing process and the filmmaking process. The disclosed method and system are directed to solve one or more problems set forth above and other problems.

BRIEF SUMMARY OF THE DISCLOSURE

One aspect of the present disclosure provides a method for implementing Write-A-Movie technology. The method is a movie generation method that includes: obtaining a screenplay of a movie; generating, according to the screenplay, an action list by performing natural language processing (NLP) on the screenplay, the action list comprising a plurality of actions with attributes, the attributes of each action including a subject, a predicate, and a location of the action; rendering, according to the action list, three-dimensional (3D) data in 3D scenes of the movie, the 3D data reflecting, for each action, the subject performing the action at the location in a corresponding 3D scene; determining camera sequence of cameras for shooting two-dimensional (2D) frames in the 3D scenes by performing an auto-cinematography optimization process; and generating a 2D video of the movie by combining the 2D frames shot by the cameras based on the determined camera sequence.

One aspect of the present disclosure provides a device for implementing Write-A-Movie technology. The device includes a memory and a processor coupled to the memory. The processor is configured to perform: obtaining a screenplay of a movie; generating, according to the screenplay, an action list by performing natural language processing (NLP) on the screenplay, the action list comprising a plurality of actions with attributes, the attributes of each action including a subject, a predicate, and a location of the action; rendering, according to the action list, three-dimensional (3D) data in 3D scenes of the movie, the 3D data reflecting, for each action, the subject performing the action at the location in a corresponding 3D scene; determining camera sequence of cameras for shooting two-dimensional (2D) frames in the 3D scenes by performing an auto-cinematography optimization process; and generating a 2D video of the movie by combining the 2D frames shot by the cameras based on the determined camera sequence.

Another aspect of the present disclosure provides a device of generating video in three-dimensional animation environment, including a memory and a processor coupled to the memory.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 4 illustrates a graphical user interface (GUI) of an exemplary editing tool according to some embodiments of the present disclosure;

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a write-a-movie technology that unifies writing and shooting (abbreviated as Write-A-Movie), involving a method and device for script-based and customizable automatic (or semi-automatic) movie generation.

There are several differences between the writing process and filmmaking process in making a movie. Firstly, there is difference in talents requirement: the screenplay writing process is focused on text writing/editing, while the filmmaking process requires much wider scope of talents. Even for an animation filmmaking, expertise in 3D modeling, character animation and rendering, camera handling, post-processing and many others are required. Secondly, there is difference in resource requirement: the screenplay writing process only requires a text editing tool, while the filmmaking process requires much wider scope of resources. Even for an animation filmmaking, 3D and postproduction software, scene models, character and object models, voice overs, and many others, are necessary resources to start. Thirdly, there is difference in execution time: the current filmmaking process starts with a finished screenplay; thus the characters and scenes of a film are undefined before having a completed screenplay, in other words, the filmmaking cannot start before a screenplay is finalized. Fourthly, there is difference in economic value: the cost of filmmaking is typically much higher than screenplay writing, the screenwriters usually get only between 2% and 3% of the film production budget. Lastly, there is difference in scarcity: only very few screenplays written end up with a film production: reports indicate roughly 50,000 screenplays are registered with the Writer's Guild of America each year. Hollywood studios release about 150 movies per year, which reflects a chance of failure rate of 99.7% for the writing efforts.

With the latest development of Artificial Intelligence (AI) technology, many jobs mentioned above in the filmmaking process can be achieved by computer, for example, Deepfake technology may have the capability of inserting celebrities into video that he/she did not act, computational cinematography may be utilized to automatically generate camera sequences that follow cinematic rules or conventions.

Existing technology of combining writing process with video making process assume that online video resources can be utilized to put together montages of video shots matching the text input, and then the selected video shots are assembled by optimizing cinematographic rules to generate the final video output. However, these approaches cannot be applied directly in the filmmaking processing for a screenplay because the combined online shots can only vaguely present the text written in screenplay, which is hard to meet the standard of a movie.

There is a strong user desire to use video as an effective storytelling form factor for writing and editing text, that is, producing a movie based on storytelling text. The present disclosure provides a write-a-movie technology that enables a normal user to go through a unified process of story writing and filmmaking and generate a movie at the end.

Specifically, Write-A-Movie enables a movie screenplay writer to pre-playback a script in writing in a format of animation video during the stage of script authoring, which can help a writer to revise script accordingly anytime. This technology can be applied on many occasions, such as interactive movies. The difference between interactive movies and traditional movies is that the formers are based on a hyper-story backbone with many branches while the later ones are telling a single story. The hyper-story structure includes many stories (branches) that share a same main story; thus the late-coming stories may reuse the animation resources of scenes and characters that have already been built in available story branches. With the growth of the hyper-story and its associated resources, for authors that can utilize existing resources, Write-A-Movie enables a "video playing while writing" experience. Clearly, this tool aims to bridge the gap of writing and filmmaking, and thus significantly reduces the threshold of normal users who want to create their own movie by only writing out a story and revising the text based on the instant animation video generated. With Write-A-Movie, the differences between writing and filmmaking in talents, resources, execution time and scarcity can be significantly reduced. Write-A-Movie can promote the spirit of sharing animation resources in content creation community to make the whole process more productive.

Write-A-Movie incorporates technologies from various areas covering natural language processing (NLP) and understanding, object auto-staging, action auto-arrangement, and computational cinematography. With minimum user interaction, the system uses an automatic workflow to derive a screenplay in development into a corresponding movie animation.

The feasibility of Write-A-Movie system is based on the following assumptions: floorplans of all scenes that the writer is planning to use in his/her screenplay are all available before the writing process; and animation resources of the characters and objects that the writer is planning to use in his/her screenplay are all available before the writing process.

Clearly these assumptions add constraints to authors, but these conditions are possible to be satisfied for the hyper-story structure, and for a writer who is willing to compromise (by reusing only the available resources) in order to achieve the "video playing while writing" experience.

To the best of the inventor's knowledge, this is the first effort in the world of such kind. The technologies enabling such experiences require natural language processing and understanding, object auto-staging, action auto-arrangement, and computational cinematography, and many others. The unifying of writing and filmmaking processes can magnificently scale up the productivity and have significant impact to the movie industry. This technology may help promote the trend of massive 3D resources sharing and reusing, and also speed up the process of writing a good screenplay.

Figure 1:
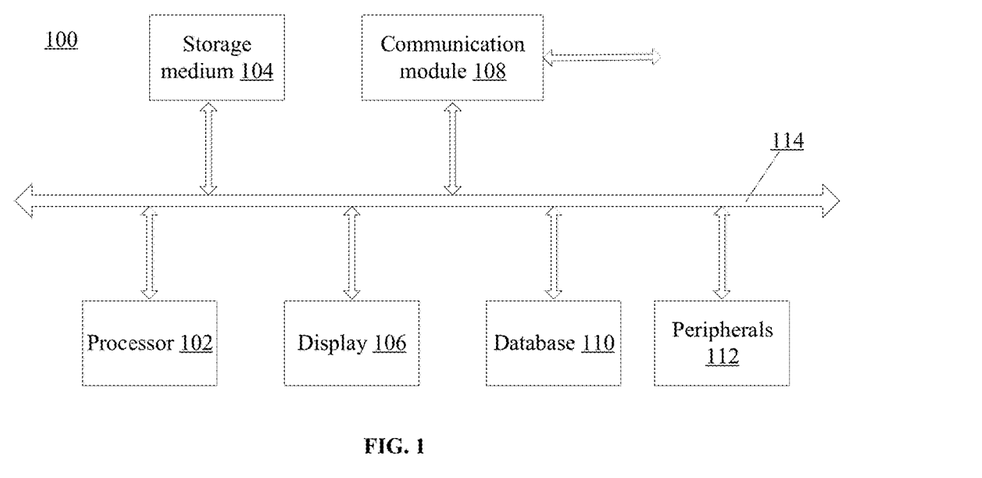
FIG. 1 is a block diagram of an exemplary computing system according to some embodiments of the present disclosure.

FIG. 1 shows a block diagram of an exemplary computing system 100 capable of implementing the disclosed Write-A-Movie method. As shown in FIG. 1, computing system 100 may include a processor 102, a storage medium 104, a display 106, a communication module 108, a database 110, and peripherals 112, and one or more bus 114 to couple the devices together. Certain devices may be omitted and other devices may be included.

Processor 102 may include any appropriate processor or processors. Further, processor 102 can include multiple cores for multi-thread or parallel processing. Processor 102 may execute sequences of computer program instructions or program modules to perform various processes, such as receiving user input in a screenplay editing tool to produce a screenplay, automatically generating action list based on the screenplay, rendering scenes based on the action list, and generating an animated video by performing editing optimization, etc. Storage medium 104 may include memory modules, such as ROM, RAM, flash memory modules, and erasable and rewritable memory, and mass storages, such as CD-ROM, U-disk, and hard disk, etc. Storage medium 104 may store computer program instructions or program modules for implementing various processes, when executed by processor 102, and may store scripts, images, animation materials, video data used in generation of motion pictures, and/or movie generated based on the disclosed method.

Further, communication module 108 may include network devices for establishing connections through a communication network. Database 110 may include one or more databases for storing certain data (e.g., images, videos, floor plan used in movie scenes, animation materials such as animation resources of characters and objects) and for performing certain operations on the stored data, such as database searching and data retrieving.

Display 106 may include any appropriate type of computer display device or electronic device display (e.g., CRT or LCD based devices, touch screens, LED display). Peripherals 112 may include various sensors and other I/O devices, such as speaker, camera, motion sensors, keyboard, mouse, etc.

In operation, the system 100 can perform a series of actions to implement the disclosed Write-A-Movie method and framework. The Write-A-Movie method and device may also be referred as motion picture generation method and device. The system 100 can implement a terminal or a server, or a combination of both. A terminal, as used herein, may refer to any appropriate user terminal with certain computing capabilities including, e.g., collecting screenplay edited by the user, displaying action review interface, rendering 3D scenes based on an action list, performing editing optimization on a video, and displaying the edited video. For example, a terminal can be a personal computer (PC), a workstation computer, a server computer, a hand-held computing device (tablet), a mobile terminal (a mobile phone or a smartphone), or any other user-side computing device. A server, as used herein, may refer to one or more server computers configured to provide certain server functionalities, such as performing natural language processing on the screenplay to produce an action list, determining camera configurations for shooting an animated video, generating the animated video based on the camera configurations, editing the animated video by finding a path with minimum cost function in a graph model. The server may also include one or more processors to execute computer programs in parallel. The terminal and/or the server may be configured to provide structures and functions for such actions and operations. In some embodiments, some part of the actions may be performed on the server, and other part of the actions may be performed on the terminal.

A movie is generated based on a script or a screenplay. The terms script and screenplay is used interchangeably in the present disclosure and they refer to texts describing character dialogues, acting instructions, and scene descriptions and directions in the movie. The terms user, writer, and author are used interchangeably in the present disclosure and they refer to the creator of the screenplay and the movie. A movie is formed by a plurality of scenes in sequence describing a series of actions/events. An action list, as used herein, may refer to a list that annotates what event happens at what time with regard to what character or object based on the script/screenplay of the movie. Each scene of a movie may be shot by a camera (e.g., virtual camera placed in the 3D environment). Apparently, different camera settings can be used to shoot a same scene. Embodiments of this disclosure uses a Scene as the basic unit of the screenplay. However, it can be understood that the disclosed system can also be applied with units smaller than a Scene. A camera sequence of a movie, as used herein, may refer to chronologically-listed sequence of configurations of cameras that shot the scenes included in the movie. The camera sequence can specify, for example, where to place the camera to shoot the scene, what settings (e.g., shot size and angle) to use when shooting the scene, how long is the time duration of this shot (e.g., how many unit time lengths), etc.

Figure 2:
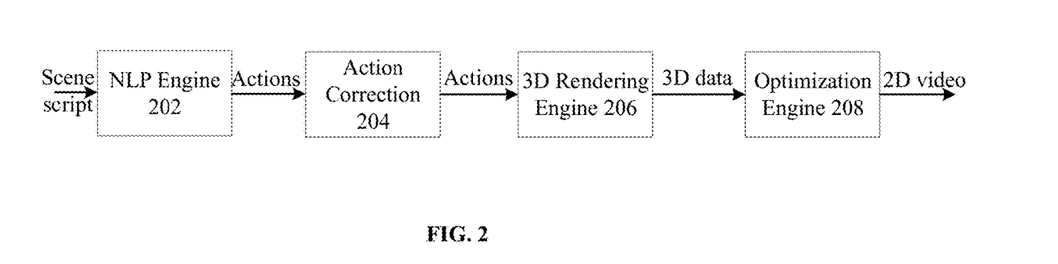
FIG. 2 illustrates an exemplary system architecture 200 of a Write-A-Movie system according to some embodiments of the present disclosure.
Figure 3:
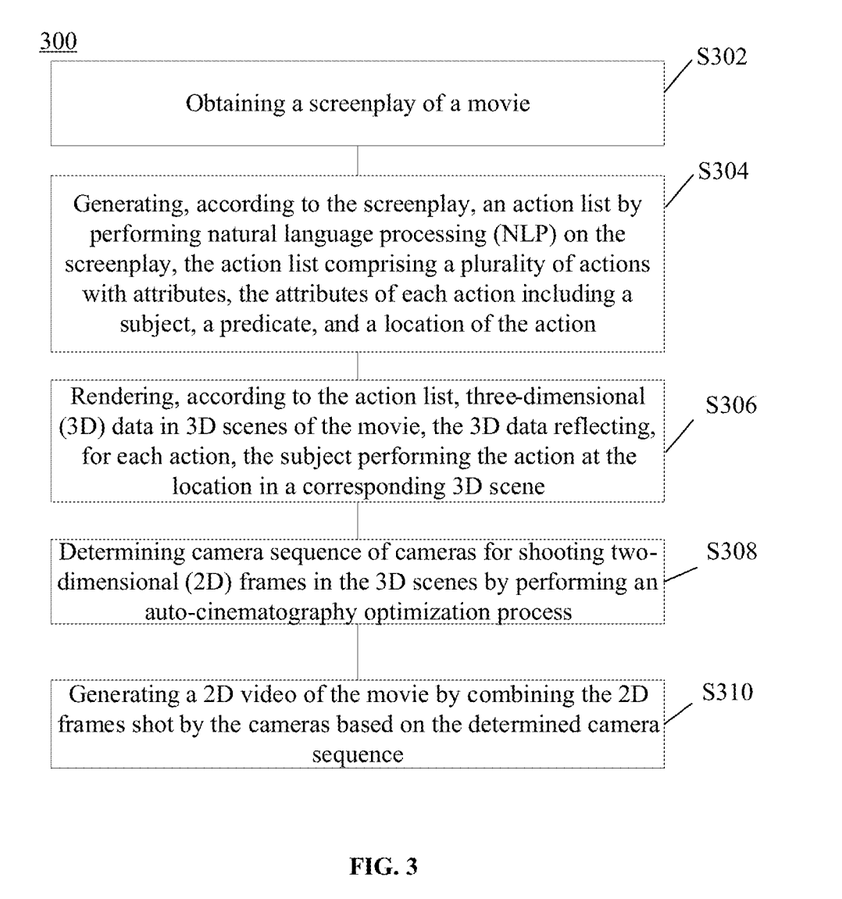
FIG. 3 is a flow chart illustrating an exemplary Write-A-Movie process 300 according to some embodiments of the present disclosure.

FIG. 2 illustrates an exemplary system architecture 200 of a Write-A-Movie system according to some embodiments of the present disclosure. FIG. 3 is a flow chart illustrating an exemplary Write-A-Movie process 300 according to some embodiments of the present disclosure. The exemplary process 300 and the exemplary system 200 can be implemented by the system 100 (e.g., one or more processors 102 being configured to execute programs to implement the disclosed functionalities).

As shown in FIG. 2 and FIG. 3, the Write-A-Movie system 200 takes the script of a Scene, i.e., Scene script, to go through an NLP engine 202 which automatically converts the script into a list of actions, i.e., an action list. An action correction component 204 is optionally involved for a user to revise action attributes, and/or fix the errors that could be introduced due to the script understanding capability of the NLP engine 202. When receiving a user-verified action list, a 3D rendering engine 206 can generate 3D data that reflects performances of characters in 3D scene(s). An optimization engine 208 is configured to choose camera for every output 2D frame among all possible choices in an auto-cinematography optimization process (e.g., find an optimized camera sequence). The combination of the 2D frames output by the optimization engine is a 2D video, which is a movie generated by the Write-A-Movie system.

Specifically, the system 200 obtains the screenplay of the movie (S302) written by the user. In some embodiments, the Write-A-Movie system provides users with an editing tool for writing a screenplay. The editing tool is feasible to both professional and non-professional screenplay writers, and a normal user is able to master the editing tool in short period of time.

In some embodiments, the system 200 may also obtain floorplans of scenes in the movie, and animation resources of characters and objects of the movie. The customizable candidate options provided by the editing tool may be generated based on the floorplans, the characters, and the objects. For example, the editing tool may provide a menu including selectable candidate locations of scenes in the movie. The candidate locations are corresponding to the floorplans. For another example, the editing toll may provide a menu including selectable candidate characters/objects occurred in the movie. The names of the characters/objects can be obtained from the animation resources of the characters and the objects.

FIG. 4 illustrates a graphical user interface (GUI) of an exemplary editing tool according to some embodiments of the present disclosure. As shown in FIG. 4, the GUI may include an area designated for screenplay editor 402 (e.g., left column of the figure) and a preview area 404 designated to present the generated screenplay in a professional format (e.g., right column of the figure).

The screenplay editor 402 may include multiple selectable labels 4022 corresponding to elements that can be added to a screenplay, such as fade in, fade out, header (e.g., a scene heading describing the location and time of day for a scene), character and dialogue (e.g., a character appeared in the scene and its lines of speech), description (e.g., a narrative description of events of the scene). For example, when "+Fade In" label is first selected, the element "Fade in" is added to the screenplay. When "+Header" label is selected, selectable controls related to scene heading are added to the editing area 4024. The selectable controls may include drop-down menus that allow a user to select different options of places, characters, and times for the current scene. The "+Character & Dialogue" label is configured to, when being selected, add character options (e.g., a drop-down menu listing available characters), character action and/or attitude/emotion options, and a text box for entering speech of the selected character to the editing area 4024. The "+Description" label is configured to, when being selected, add a text box in the editing area 4024 for the user to enter narrative description about the scene.

Each element shown in the editing area 4024 may have a corresponding location adjustment icon and a deletion icon. When dragging the location adjustment icon up and down in the editing area 4024, the corresponding element can be moved upward and downward in the structure of the screenplay.

The editing tool is configured to provide customized functions of adding and revising elements of a screenplay by simply clicking buttons and filling forms. The result of such addition and revision of the screenplay can be reviewed in a professional format (e.g., with fonts, formats, page organizations and margins conformed with the professional requirement of screenplays).

Returning to FIG. 3, NLP can be performed on the screenplay to generate an action list. The action list includes a plurality of ordered actions with attributes, the attribute of each action including a subject, a predicate, and a location of the action (S304). For example, the output of the script editing tool, i.e., a user generated scene script, can be input to the NLP engine 202 for an automatic extraction and conversion to a list of actions. The NLP engine 202 is configured to automatically analyze sentences in the scene script using natural language processing (NLP) techniques and generate an action list. The action list includes a list of actions and associated attributes of the actions.

An action includes one or more of the following components. Subject: it is typically a character in the script, or a physical object (e.g., a book, a tree, etc.) that may trigger an action. Predicate: the action, for example, walk, sit, speak and so on. Object: the receiving party of an action, such as a character or a physical object. Emotion: the emotional expression of the subject during executing an action. Location: the destination of an action (e.g., walking to somewhere) or the location where the action occurs. Duration: the duration in time of the action, for example, the duration of a conversational sentence.

In some embodiments, the floorplans provided by the user to the system 200 may include labeled location indicators. The NLP engine 202 can be configured to determining the location of an action by identifying a phrase in the screenplay corresponding to one of the labeled location indicators.

The NLP engine 202 is configured to break a paragraph of the script into sentences, and process each sentence to convert it into one or more actions. These actions are in an ordered sequence in execution. In some embodiments, some of the actions may run in parallel, the system 200 provides user capabilities to specify the relationship among actions (e.g., by using certain keywords in the screenplay recognizable by the NLP engine 202, such as "at the same time", and/or by specifying same time of such actions through the action correction component 204). In some embodiments, if the NLP engine 202 cannot map the Subject and/or Object of an action to an identifiable character or object successfully, the assistance of the user would be useful to make the correction through the action correction component 204. The Write-A-Movie system 200 should be smart enough to minimize unnecessary user interference. That is, minimum assistance is required for user to correct the action list and associated attributes.

Figure 5:
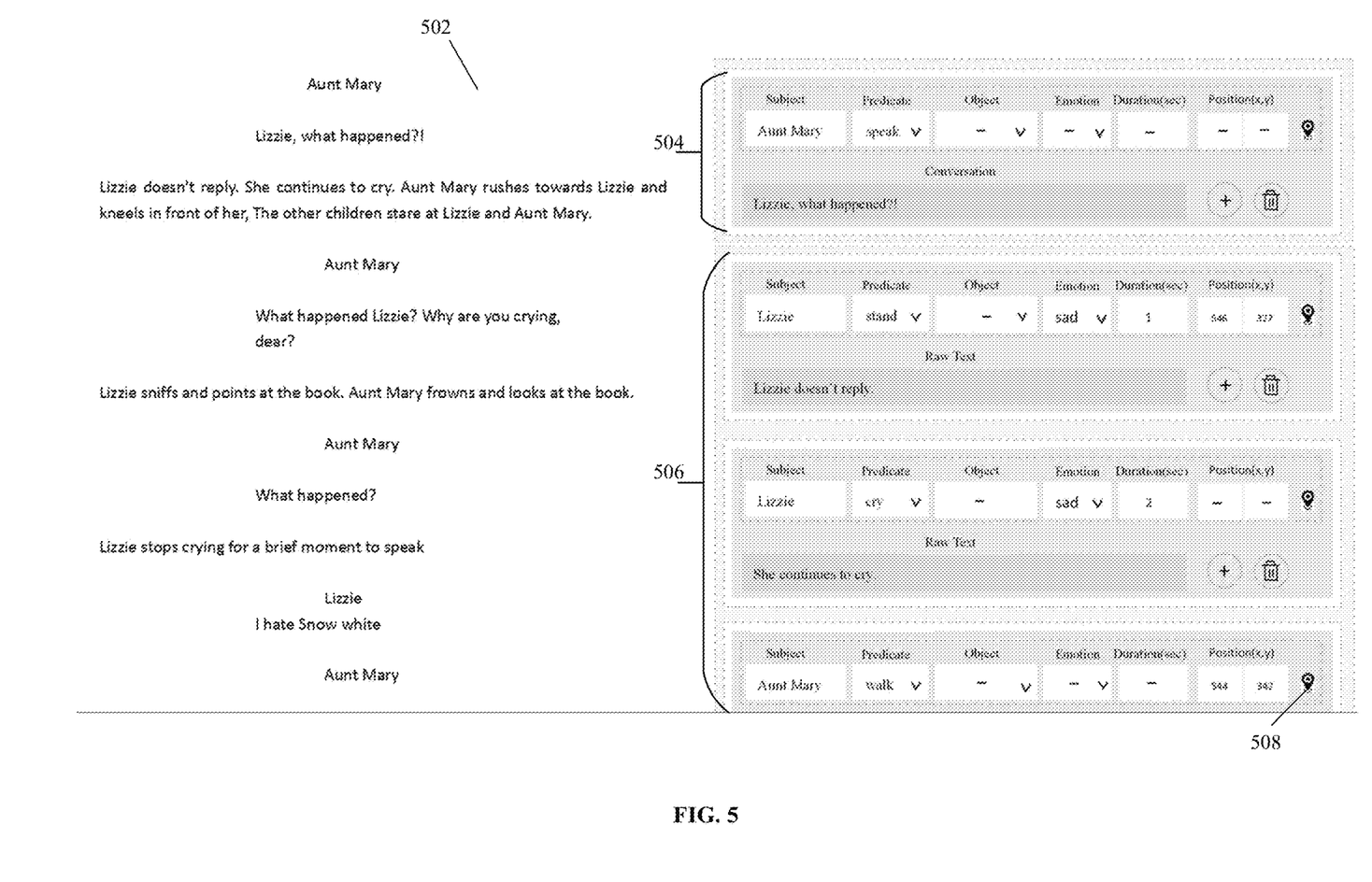
FIG. 5 illustrations an exemplary action review interface 500 for presenting an action list according to some embodiments of the present disclosure.

The action correction component 204 may support an action review interface to allow user review and revision on action list generated by the NLP engine 202. FIG. 5 illustrations an exemplary action review interface 500 for presenting an action list according to some embodiments of the present disclosure. As shown in FIG. 5, screenplay review area 502 may display a current section of script corresponding to the action list shown in the action presentation areas 504 and 506.

Each action presentation area may display one or more action units corresponding to an element in the screenplay, each action unit corresponding to one action. For example, the action presentation area 504 includes one action unit corresponding to the first element shown in the screenplay review area 502, i.e., the character and dialogue element of a speech by Aunt Mary. The action presentation area 506 includes multiple action units corresponding to the second element shown in the screenplay review area 502, i.e., the narrative description about multiple characters Lizzie, Aunt Mary, and so on. Each action unit identifies a subject, a predicate of the subject (e.g., speak, stand, cry, walk), and a text about the subject from the script (e.g., a conversation spoken by the subject or a raw text describing the subject).

Further, the user is offered the capability of revising the action and associated attributes such as location and timing. That is, the attributes of the actions and options to revise the attributes are presented in the action review interface. In some embodiments, revisable attributes of an action comprising at least one of the predicate, the location, or a time duration of the action. A revised attribute of an action based on user input at the action review interface can be generated, and a revised action list is generated according to the revise attribute.

In some embodiments, the action correction component 204 is configured to allow the user to correct the actions and associated attributes which are automatically extracted from the script by the NLP engine 202. The predicate of the subject can be adjusted based on user input (e.g., by selecting other options in the drop-down menu as shown in FIG. 5). In some embodiments, the subject and/or the text are unchangeable in the action correction unit, e.g., shown as gray in FIG. 5. The action unit may include a deletion icon for deleting this action entirely, and/or an addition icon to add another action unit. The action unit may also include other adjustable attributes, such as object of the predicament, emotion of the character, duration (e.g., specified in time units such as seconds), and/or position (e.g., specified by coordinates in a 3D scene or a 2D floorplan corresponding to the 3D scene).

The action unit may further include a positioning icon 508 configured to, when being selected, present a 3D scene corresponding to the action or a floorplan of the 3D scene. The staging of characters is an important task for filmmaking. The present disclosure provides automatic staging approach to speed up the staging process and relieve manual intervention and efforts. In some embodiments, the NLP engine 202 is configured to perform automatic staging with assistance from a floorplan of the scene. For example, one or more floorplans with labeled locations can be input to the NLP engine 202. The NLP engine 202 can identify a floorplan corresponding to a scene, and/or identify a specific labeled location in the floor plan corresponding to the scene according to location keyword(s) extracted from a sentence in the screenplay.

Figure 6A:
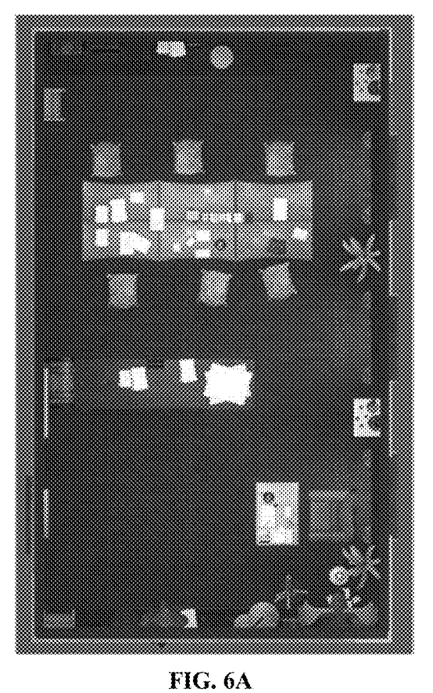
FIG. 6A illustrates a top view of an exemplary 3D scene according to some embodiments of the present disclosure.
Figure 6B:
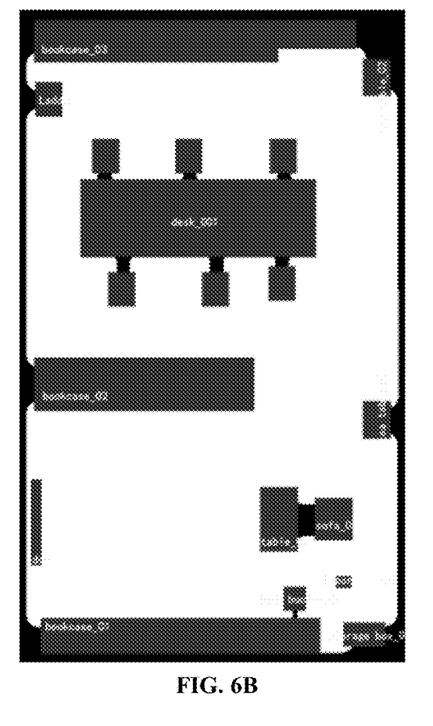
FIG. 6B illustrates a floorplan of the exemplary 3D scene shown in FIG. 6A.

FIG. 6A illustrates a top view of an exemplary 3D scene according to some embodiments of the present disclosure. FIG. 6B illustrates a floorplan of the exemplary 3D scene shown in FIG. 6A. As shown in FIG. 6B, the floorplan of the current scene with all the location labelled can support for the author/user during the script writing process to describe the location of the action. In some embodiments, when the location indicated in the action unit of the action review interface 500 is blank (that is, the NLP engine did not recognize a location for the action) or an undesired location, the user can simply select the positioning icon 508 to review the floorplan, and click on the displayed floorplan to assign a location for the action. The action correction component 204 can record and convert the user-clicked position into corresponding coordinates in the 3D scene. In other words, a first user selection of entering (e.g., revising or specifying) a location of an action may be received in the action review interface (e.g., selecting the positioning icon 508 in an action unit). In response to the first user selection, a floorplan corresponding to the action can be displayed. A second user selection on a specified location in the floorplan can be obtained. The location attribute of the action can be updated according to the second user selection (e.g., a position where the user clicked on the floorplan).

Further, a facing direction of a character/object of an action can be calculated based on a moving direction to a next location (e.g., the moving direction of a subject from a location of the current action to a location of the next action of the same subject). A trace of character movement in a scene can be a reference for the user/writer to double check the actions are arranged properly. In some embodiments, when reviewing and editing of actions and attributes of a current scene is completed, the action review interface may generate a trace movement map of character(s) appeared in the current scene according to attributes of the actions of the current scene and a sequence/order of these actions. In other words, a trace movement map of a scene is displayed based on a floorplan of the scene, actions corresponding to the scene, and sequence of the actions corresponding to the scene, the trace movement map including a movement track and a movement direction of a character or an object in the scene. The user may review the trace movement map and if any undesired movement or location of certain character/object is found, the system may allow the user to go back to the action review interface to make desired revisions.

Figure 7:
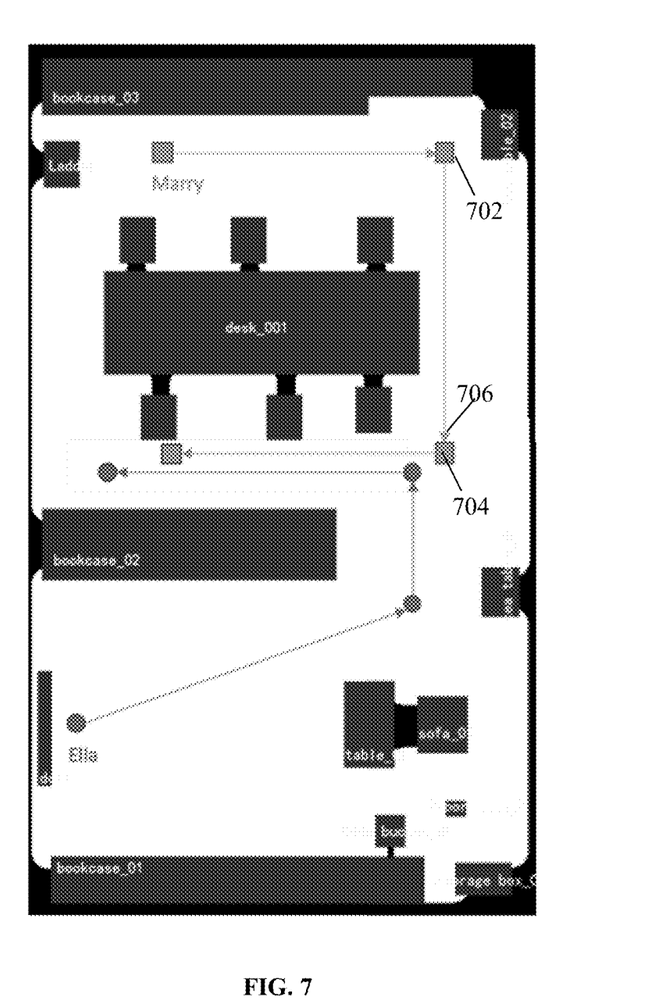
FIG. 7 illustrates traces of character movements in the floorplan shown in FIG. 6B.

FIG. 7 illustrates traces of character movements in the floorplan shown in FIG. 6B. As shown in FIG. 7, trace movements of two characters are shown in the floor plan. Each dot or square indicates a location of an action, and the arrow indicates the sequence between two actions of the subject. Take character Mary as an example, Mary's action at location 704 is immediate subsequent to her action at location 702, so the arrow 706 starts from location 702 and points to location 704. The use may view the trace movement map and adjust a location of an action and/or sequence of the actions as needed (e.g., through performing interactive operations on the labels/lines/arrows shown on the trace movement map and/or revising action attributes in the action review interface).

The output of the NLP engine 202 and the optional action correction component 204 is an action list including actions and attributes arranged in an order consistent with the screenplay.

Returning to FIG. 3, 3D data can be rendered in 3D scenes of the movie according to the action list (S306) (e.g., the action list output by the NLP engine 202 or the action correction component 204). An action is the basic execution unit for the 3D rendering engine 206. According to the action list, the 3D rendering engine 206 is configured to demonstrate the performance of the story described by the screenplay with virtual 3D models. The 3D rendering engine 206 may produce 3D data including at least one of 3D scenes, 3D characters and objects occurred in the scene, or movements of the 3D characters and objects in the 3D scenes.

In some embodiments, the duration of an action may be specified by the writer/user in the action review interface. When the duration is not specified, the 3D rendering engine 306 may be configured to determine the duration. In this way, every character/object maintains a timeline of actions, and some actions of some characters/objects may run in parallel. A map of actions for all characters/objects in timeline can be generated when all the corresponding time information for each action is calculated or specified.

To convert the 3D scene into 2D video, an automatic cinematography module (e.g., the optimization engine 208) is incorporated to dynamically select the camera for each frame of the output video. In other words, camera sequence of cameras for shooting two-dimensional (2D) frames in the 3D scenes can be determined by performing an auto-cinematography optimization process (S308). In some embodiments, a hint-based optimization process is employed by the auto-cinematography, which guarantees preferences of the writer can be considered in the final video generation. This effectively allows the writer to influence the final video outcome.

In Write-A-Movie, every writer/user implicitly becomes a director, who can decide what is important (e.g., who is Protagonist whose action has substantial impact, which object reflects non-negligible clues, and so on), the scene vibe (e.g., audience perceived intensity, conflict and emotional intensity, and so on), the attention model (e.g., character fear intensity, bad guy intensity, handheld intensity, and so on), and many other factors that may directly impact to the perception of the audiences.

Figure 8:
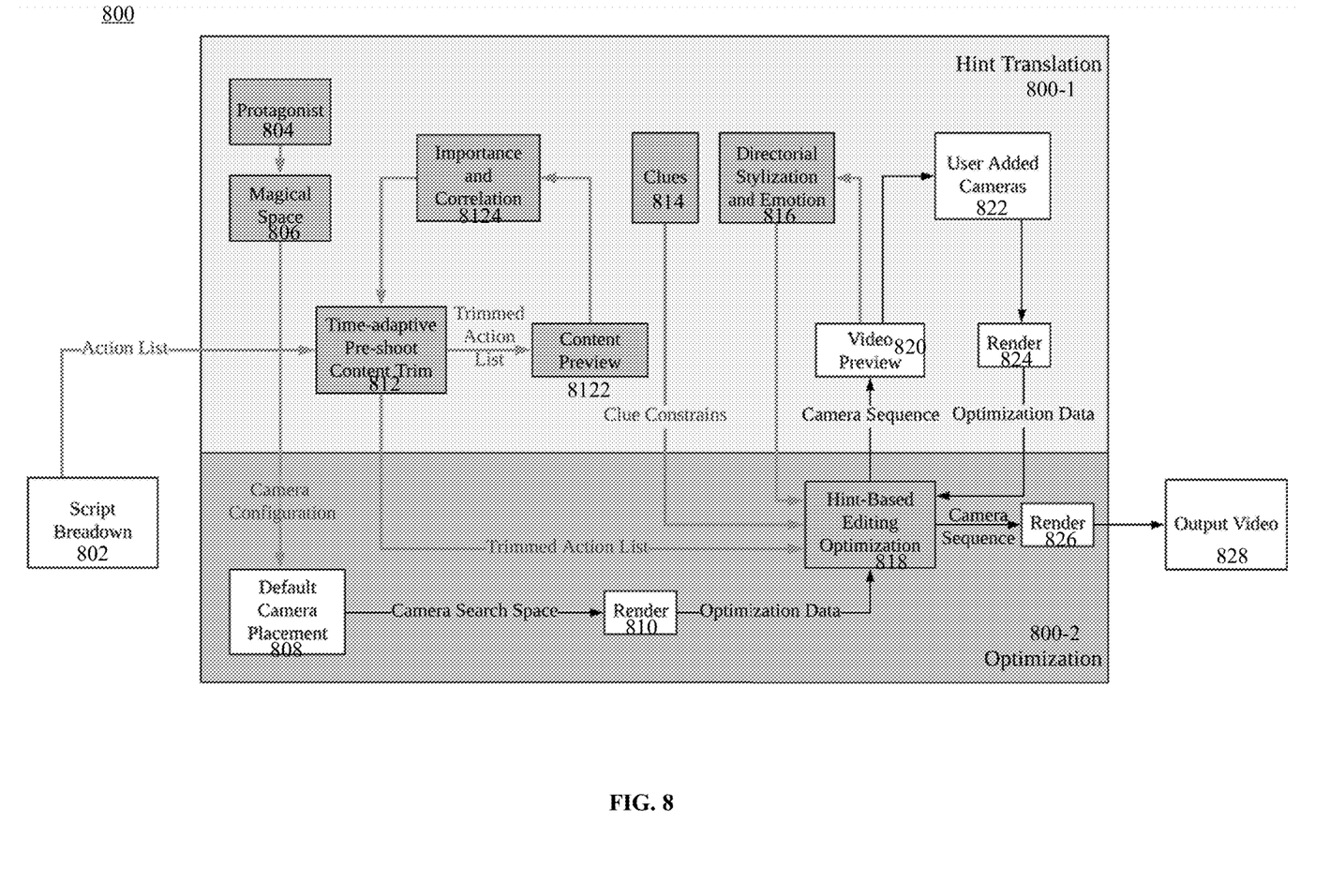
FIG. 8 illustrate an exemplary hint-based auto-cinematography framework 800 according to some embodiments of the present disclosure.

FIG. 8 illustrate an exemplary hint-based auto-cinematography framework 800 according to some embodiments of the present disclosure. The framework 800 used in Write-A-Movie allows the writer to provide hints to guide the camera optimization process. The "magic space" concept is used to minimize the 7 degrees of freedom (7-dof) infinite search space to countable discrete camera configuration, and the camera placement follows the grammar of the film language. The hint-based optimization process determines the camera selection for shooting each frame of the output video. It is based on the cost function defined in a mapping process called hint translation, which is to convert author's hints into their mathematical representations to be included in the cost function as constraints.

As shown in FIG. 8, the framework 800 include two major blocks: hint translation block 800-1 and optimization block 800-2. The script breakdown 802 may be implemented by the NLP engine 202 and/or the action correction component 204 to produce an action list. The disclosed system includes hint translators configured to implement functions in the hint translation block, including getting the protagonist 804 and distribute camera configurations based on magical space 806, automatic trimming pre-shooting content 812, clues translation 814, directorial hints stylization and emotion related hint translation 816, user added cameras interface 822 and optimization data preparation 824. For example, a trimmed action list may be obtained after the time-adaptive pre-shoot content trim 812. A content preview 8122 may then be presented to the user on a user interface, and the user may make adjustments on the user interface based on importance and correlation 8124 of the actions (e.g., a user interface depicting an importance curve of the actions). Users can repetitively make adjustment to the output of the automatic camera sequence after previewing 820 the camera sequence of the optimization algorithm. Users can change the arrangement of the camera sequence in different time periods indirectly through the intuitive hint translators, or they can add user defined free cameras in the 3D animation environment. The optimization block 800-2 includes default camera placements 808, a render element 810 for rendering based on camera configurations and placements in the camera search space, hint-based optimizer 818 and through-lens detection (not shown). Director hints, or directorial hints, as used herein, refers to information that conveys or translates users' cinematography expectations. The disclosed system can obtain various types of director hints, including at least one of protagonist hint, content trim related hints, clues hint, vibe related hint, directorial style related hint, and/or user add free cameras. A user of the disclosed system can decide whether or not to provide these director hint inputs to impact the movie making. The director hints can affect the automatic-cinematography process at different stages, such as when determining which camera(s) to use to shoot a scene, what camera configuration to be employed to shoot a scene, whether to include certain portions of a shot scene into the final movie, etc.

In operation, based on the framework 800, the auto-cinematography process may include obtaining and translating directorial hints for making a 3D animated movie based on user input, determining camera configurations in a 3D environment according to the directorial hints, establishing a camera search space that includes multiple candidate cameras to be used at different timestamps to shoot one or more scenes of the movie based on the camera configurations; when the camera search space is established, performing hint-based editing optimization based on the camera search space and the directorial hints, such as finding proper camera placement in different scenes, (e.g., specifying shot features, orientation, and focal length of a camera for each time unit of the movie). An edited output video 828 is obtained based on a rendering result 826 when an optimal camera sequence is found. The editing optimization is formalized into a process of finding a path with minimum cost in a graph model, each path in the graph model describing a candidate camera sequence for producing the movie, and at least some of the directorial hints are translated into cost functions of the graph model. More details of the optimization process can be found in application Ser. No. 16/727,778, filed on Dec. 26, 2019.

Returning to FIG. 3, a 2D video of the movie is generated by combining the 2D frames shot by the cameras based on the determined camera sequence (S310).

In some embodiments, the 2D video can be played outcome and the user may view the 2D video and determine whether further edits are needed, such as edits to the screenplay, edits to the action attributes of the characters/objects, directing edits to camera configuration and placement. The disclosed system 200 may integrate all tools disclosed above in one software, such as screenplay editing tool, action review and correction interface, and hint-based auto-cinematography tool so that the user can review outcomes and make revisions at any stage in the movie making process (both the screenplay writing and the filmmaking process). For example, when playing or after playing the 2D video, the disclosed system may provide an option for the user to select from a plurality of editing tools to accomplish desired revision. The selection candidates may include screenplay editing tool, action review and correction interface, and hint-based auto-cinematography tool.

In some embodiments, after playing the generated 2D video, the screenplay editing tool may be presented for a user to revise the elements of the screenplay. Alternatively, when playing the generated 2D video, if the user pauses at a specific scene and select, among multiple editing tools, the screenplay editing tool to revise an element in the screenplay corresponding to the paused scene. An updated 2D video according to the revised screenplay may be generated.

In some embodiments, after playing the generated 2D video, the action review interface may be presented for a user to revise the action list (e.g., revising location attribute of an action based on the floorplan). Alternatively, when playing the generated 2D video, if the user pauses at a specific scene and select, among multiple editing tools, the action review interface to revise attribute(s) of an action in the action list corresponding to the paused scene. An updated 2D video according to the revised action list may be generated.

In the present disclosure, a new technology, called Write-A-Movie, is provided to merge the completely separated script writing and filmmaking processes, to enable normal human being to make a movie by simply writing out a story using the tool. To the best of the inventor's knowledge, this is the first work in the world that using a script writing tool to drive the filmmaking process. A novel framework, that bridges script understanding, action list generation, action correction, auto (or semi-auto) staging, 3D rendering, hint-based auto-cinematography into a unified process, has been demonstrated to facilitate movie generation based on simply story writing and user preferences during the filmmaking process.

Write-A-Movie enables a unique "video playing while writing" experience. This technology will have long-term impact on media industry as well as display industry, as it triggers a much wider group of potential writers and media contributors that can bring their ideas and stories to the screens. This vision has not been possible before the invention and deployment of such technology.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A movie generation method for a computing device, comprising:
   obtaining a screenplay of a movie, the screenplay being a text;
   generating, according to the screenplay, an action list by performing natural language processing (NLP) processing on the text of the screenplay, the action list comprising a plurality of actions with attributes, the attributes of each action including a subject that triggers the action, a predicate that describes the action, an object that receives the action, an emotional expression of the subject and/or the object, a time duration of executing the action, and a location where the action occurs;
   rendering, according to the action list, three-dimensional (3D) data in 3D scenes of the movie, the 3D data reflecting, for each action, the subject performing the action at the location in a corresponding 3D scene;
   determining camera sequence of cameras for shooting two-dimensional (2D) frames in the 3D scenes by performing an auto-cinematography optimization process; and
   generating a 2D video of the movie by combining the 2D frames shot by the cameras based on the determined camera sequence, wherein generating the action list comprises:
  breaking a paragraph of the text of the screen play into sentences;
  automatically processing each sentence and converting the sentence into one or more of the actions by performing the NLP processing; and
  ordering a sequence of the actions according to a sequence of the sentences.

2. The method according to claim 1, further comprising:
obtaining floorplans of the 3D scenes of the movie, and animation resources of characters and objects of the movie; and
rendering the 3D data in the 3D scenes based on the floorplans and the animation resources.

3. The method according to claim 2, wherein:
the floorplans include labeled location indicators; and
the method further comprises: determining the location of an action by performing the NLP processing to identify a phrase in the screenplay corresponding to one of the labeled location indicators.

4. The method according to claim 2, further comprising:
displaying trace movement map of a scene based on a floorplan of the scene, actions corresponding to the scene, and sequence of the actions corresponding to the scene, the trace movement map including a movement track and a movement direction of a character or an object in the scene.

5. The method according to claim 1, wherein obtaining the screenplay comprising:
providing a screenplay editing tool allowing a user to add and revise a plurality of elements of the screenplay; and
obtaining the screenplay generated by the screenplay editing tool.

6. The method according to claim 5, further comprising:
playing the generated 2D video;
after playing the generated 2D video, displaying the screenplay editing tool for a user to revise the elements of the screenplay; and
generating an updated 2D video according to the revised screenplay.

7. The method according to claim 1, further comprising:
presenting, in an action review interface, the attributes of the actions and options to revise the attributes, revisable attributes of an action comprising at least one of the predicate, the location, or the time duration of the action;
obtaining a revised attribute of an action based on user input at the action review interface; and
generating a revised action list according to the revise attribute, wherein the 3D data is rendered according to the revised action list.

8. The method according to claim 7, further comprising:
receiving a first user selection of entering the location of the action in the action review interface;
in response to the first user selection, displaying a floorplan corresponding to the action;
obtaining a second user selection on a specified location of the action in the floorplan; and
updating the location attribute of the action according to the second user selection.

9. The method according to claim 7, further comprising:
playing the generated 2D video;
after playing the generated 2D video, displaying the action review interface for a user to revise the action list; and
generating an updated 2D video according to the revised action list.

10. The method according to claim 1, wherein ordering the sequence of the actions comprises:
revising the sequence of the actions according to a user instruction that specifies a relationship among the actions, the user instruction including at least one of specifying two of the actions are running in parallel, or switching a sequence of two of the actions.

11. The method according to claim 1, wherein generating the action list further comprises: for one action
when the NPL processing does not map the subject and/or the object of the action to an identifiable character or object successfully, receiving a user instruction to determine the subject and/or the object of the action.

12. A movie generation device, comprising: a memory and a processor coupled to the memory and configured to perform:
obtaining a screenplay of a movie, the screenplay being a text;
generating, according to the screenplay, an action list by performing natural language processing (NLP) processing on the text of the screenplay, the action list comprising a plurality of actions with attributes, the attributes of each action including a subject that triggers the action, a predicate that describes the action, an object that receives the action, an emotional expression of the subject and/or the object, a time duration of executing the action, and a location where the action occurs;
rendering, according to the action list, three-dimensional (3D) data in 3D scenes of the movie, the 3D data reflecting, for each action, the subject performing the action at the location in a corresponding 3D scene;
determining camera sequence of cameras for shooting two-dimensional (2D) frames in the 3D scenes by performing an auto-cinematography optimization process; and
generating a 2D video of the movie by combining the 2D frames shot by the cameras based on the determined camera sequence,
wherein generating the action list comprises:
  breaking a paragraph of the text of the screen play into sentences;
  automatically processing each sentence and converting the sentence into one or more of the actions by performing the NLP processing; and
  ordering a sequence of the actions according to a sequence of the sentences.

13. The device according to claim 12, wherein the processor is further configured to perform:
obtaining floorplans of the 3D scenes of the movie, and animation resources of characters and objects of the movie; and
rendering the 3D data in the 3D scenes based on the floorplans and the animation resources.

14. The device according to claim 13, wherein:
the floorplans include labeled location indicators; and
the processor is further configured to perform: determining the location of an action by performing the NLP processing to identify a phrase in the screenplay corresponding to one of the labeled location indicators.

15. The device according to claim 13, wherein the processor is further configured to perform:
displaying trace movement map of a scene based on a floorplan of the scene, actions corresponding to the scene, and sequence of the actions corresponding to the scene, the trace movement map including a movement track and a movement direction of a character or an object in the scene.

16. The device according to claim 12, wherein obtaining the screenplay comprising:
   providing a screenplay editing tool allowing a user to add and revise a plurality of elements of the screenplay; and
   obtaining the screenplay generated by the screenplay editing tool.

17. The device according to claim 16, wherein the processor is further configured to perform:
   playing the generated 2D video;
   after playing the generated 2D video, displaying the screenplay editing tool for a user to revise the elements of the screenplay; and
   generating an updated 2D video according to the revised screenplay.

18. The device according to claim 12, wherein the processor is further configured to perform:
   presenting, in an action review interface, the attributes of the actions and options to revise the attributes, revisable attributes of an action comprising at least one of the predicate, the location, or a time duration of the action;
   obtaining a revised attribute of an action based on user input at the action review interface; and
   generating a revised action list according to the revise attribute, wherein the 3D data is rendered according to the revised action list.

19. The device according to claim 18, wherein the processor is further configured to perform:
   receiving a first user selection of entering the location of the action in the action review interface;
   in response to the first user selection, displaying a floorplan corresponding to the action;
   obtaining a second user selection on a specified location of the action in the floorplan; and
   updating the location attribute of the action according to the second user selection.

20. The device according to claim 18, wherein the processor is further configured to perform:
   playing the generated 2D video;
   after playing the generated 2D video, displaying the action review interface for a user to revise the action list; and
   generating an updated 2D video according to the revised action list.

* * * * *